Patented Oct. 10, 1922.

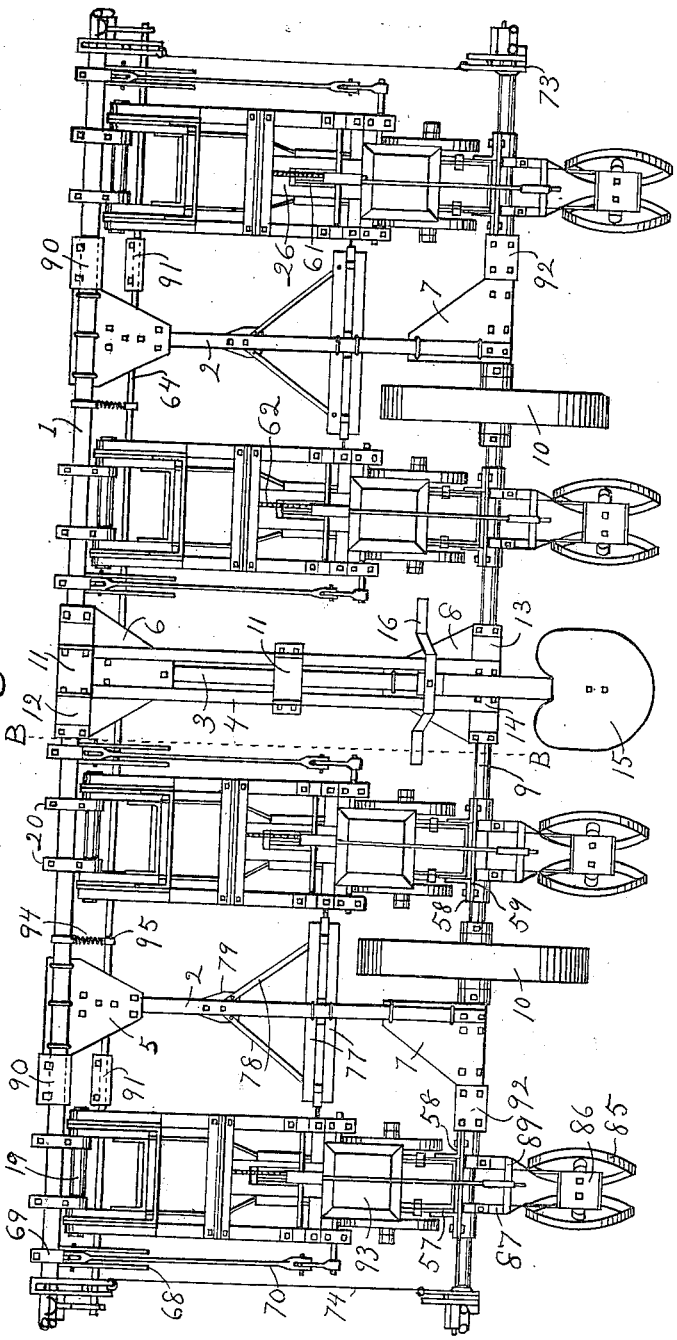

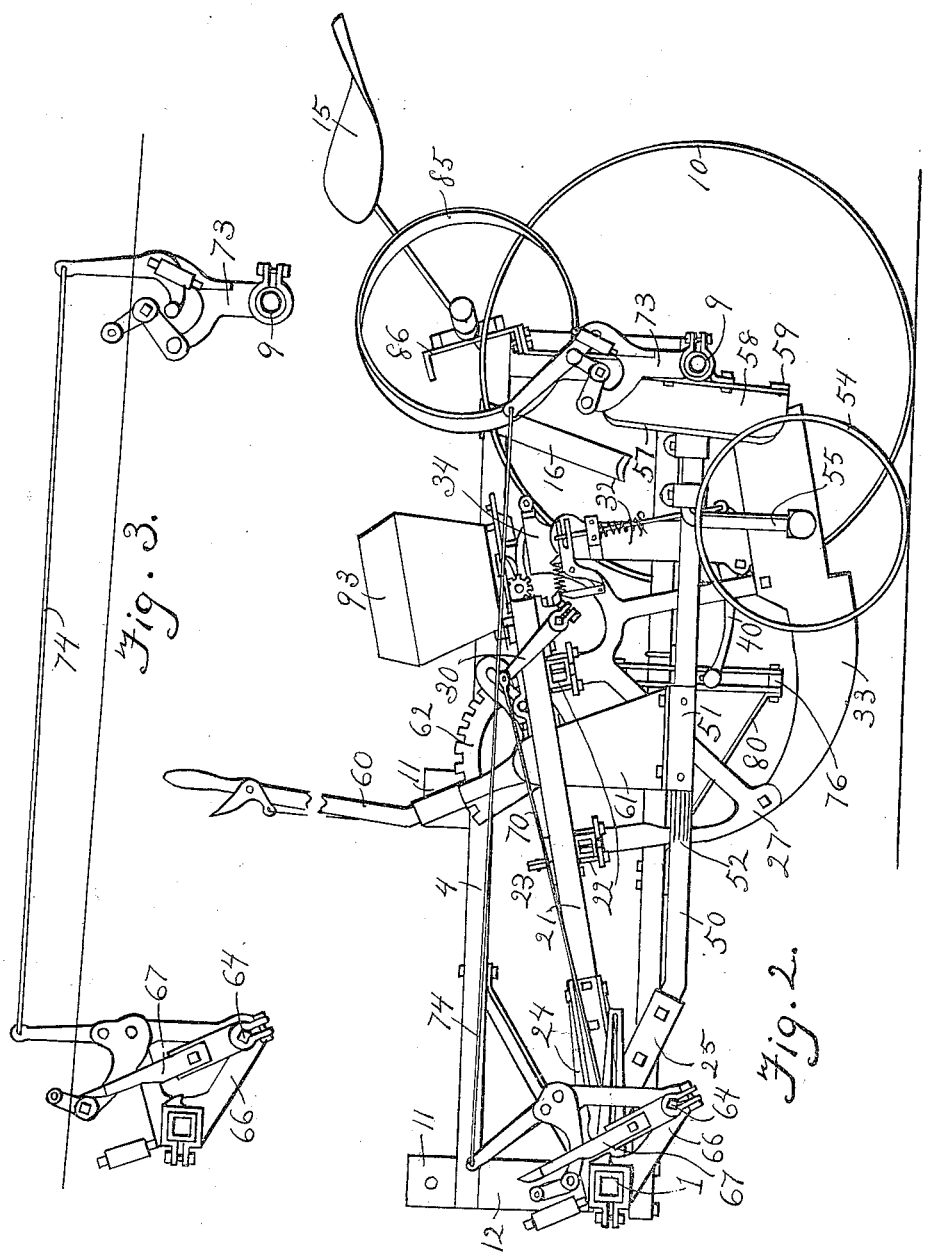

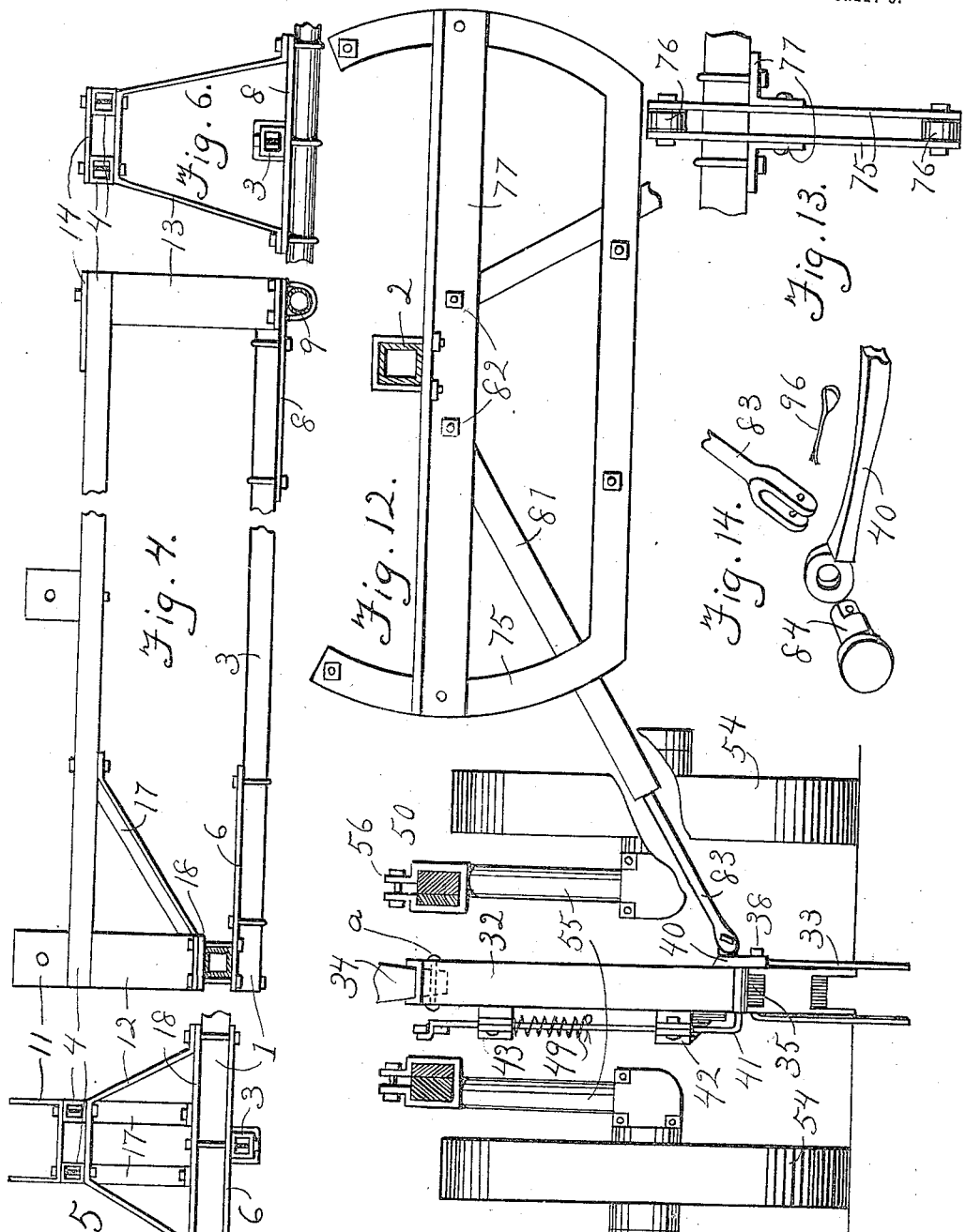

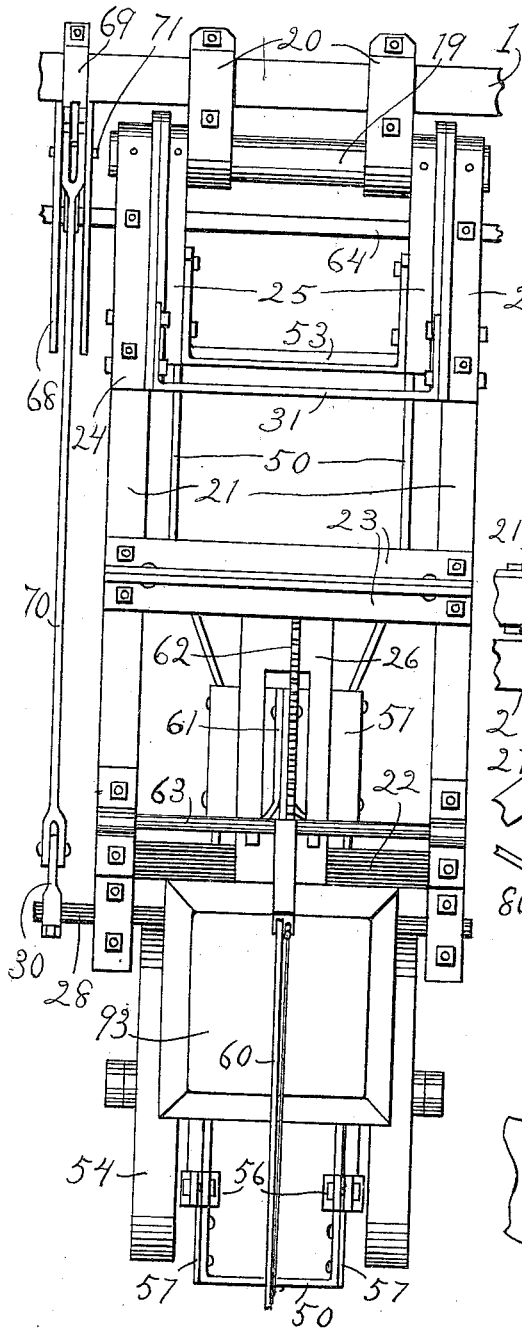

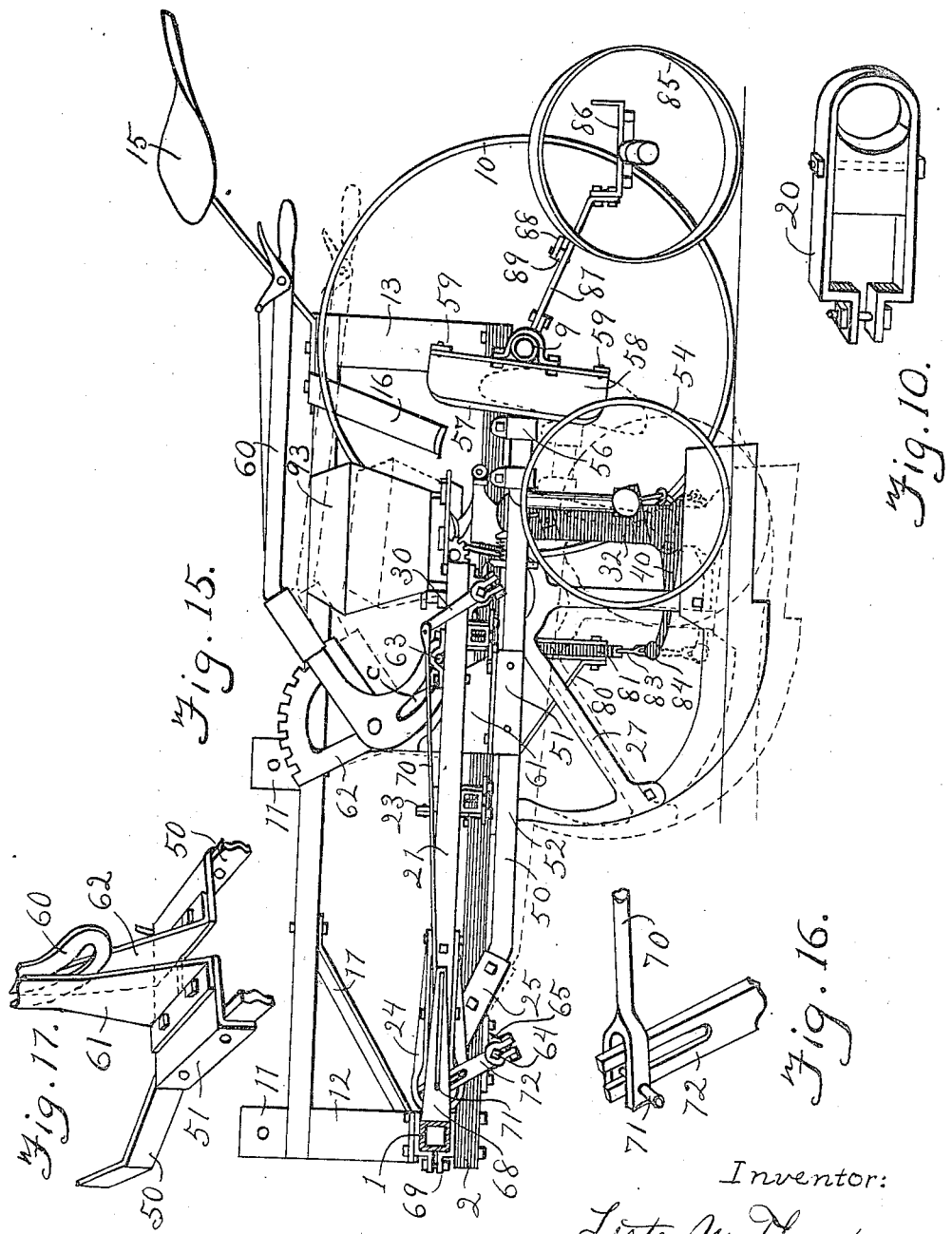

1,431,767

UNITED STATES PATENT OFFICE.

LESTER M. THOMPSON, OF TAYLORVILLE, ILLINOIS.

PLANTER.

Application filed April 16, 1920. Serial No. 374,319.

*To all whom it may concern:*

Be it known that I, LESTER M. THOMPSON, a citizen of the United States, residing at Taylorville, in the county of Christian and State of Illinois, have invented new and useful Improvements in Planters, of which the following is a specification.

This invention relates to corn planters and its general object is to provide a machine that will plant corn, or any seed suitable to be planted with a corn planter, at a uniform depth in three or more rows the same distance apart, on rough or uneven ground, and with equal pressure on all covering wheels. It is therefore directed to providing such a planter with the following features: 1st—A main frame to which draft members may be fixed and to support the driver, and wherein three or more single row planting units may be pivotally mounted so as to be automatically adjusted to the inequalities of the ground: 2nd—Parts designed to control the position of the checking valves of the units so that their centers will always be in the same vertical plane: 3rd—Means for simultaneously operating the planting mechanism of all the units, including checking valves adapted to secure this result: 4th—Covering wheels for each row, that will work independently of the units: 5th—Check heads and wire guides suitable for this type of planter.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like numbers designate like and corresponding parts in all the views, and in which:

Figure 1 is a top plan view of the planter.

Fig. 2 is a left side elevation of the planter, with runners and covering wheels in raised position.

Fig. 3 is a side elevation of the left check head and wire guide, showing the wire release in operation.

Fig. 4 is a vertical section through the main frame on the line B—B, and a side elevation of the seat and draft supporting members.

Fig. 5 is a front elevation of the draft supporting members of the main frame.

Fig. 6 is a rear elevation of the seat supporting members of the main frame.

Fig. 7 is a plan view of the planting unit.

Fig. 8 is a detail perspective view of one of the pivotal members of the lower frame of a planting unit.

Fig. 9 is a detail perspective view of one of the pivotal members of the upper frame of a planting unit.

Fig. 10 is detail perspective view of one of the offset clamps for holding a pivotal bar to the main frame.

Fig. 11 is a left side elevation in detail of valve operating mechanism, boot and control rod, with side of boot cut away to show valve in operative position.

Fig. 12 is a rear elevation of a control device, boot and unit ground wheels.

Fig. 13 is a side elevation of a control rod guide.

Fig. 14 is a detail perspective view of parts of a control device.

Fig. 15 is a left side elevation of the planter without check heads and wire guides, showing the side of a lever support cut away and runners and covering wheels in operative position.

Fig. 16 is a detail perspective view of the upper end of a main rock shaft arm and the end of a connecting rod.

Fig. 17 is a detail perspective view of the lever support of a main throw bar arm and the end of a connecting rod.

Fig. 18 is a detail perspective view of one of the offset clamps for holding a pivotal bar to the main frame.

Referring more particularly to the drawings 1 designates the main draw bar which is of square tubing and forms the front member of the main frame. Plates 5 and 6 are secured to the underside of 1 by U-bolts, and bars 2 and 3 of square tubing, which are similarly bolted to the underside of these plates, extend backwardly and are bolted through plates 7 and 8 to the axle 9. Ground wheels 10 are mounted on axle 9 and thus support the rear of the frame. The front of the main frame will of course be supported on a tongue (not shown in the drawings) which may be bolted in the U-shaped plates 11. These plates are bolted to bars of square tubing 4 that extend from the top of a supporting member 12, bolted to the draw bar 1, to another supporting member 13 bolted to axle 9. A plate 14 is bolted to the top of bars 4 at the point of their attachment to the support 13, and the spring of seat 15 and the foot rest 16 are mounted on this plate. This structure is stiffened by two braces 17, the upper ends of which are bolted to bars 4, thence extending to a plate 18 positioned on top of draw bar 1 under the supporting member 12.

Within the main frame described in the foregoing, four single row planting units are arranged at equal distances apart, the front end of each unit being pivoted to a piece of round tubing 19, previously designated as a pivotal bar, that is clamped to the draw bar 1 and parallel thereto by offset clamps 20, detailed construction of which is shown in Fig. 18.

Each unit has an upper and a lower frame, the upper frame supporting a seed can and all planting elements, the lower frame being supported at the rear on ground wheels fixed to it, and having a lever mounted thereon which engages the upper frame for adjusting it in relation to the ground. The side bars 21 of the upper frame are of square tubing, spaced by two bars 22 of the same material, bolted across underneath, also by two angle bars 23 riveted together and bolted across on top of bars 21 and over the front bar 22. The front ends of bars 21 are bolted in members 24 shown in detail in Fig. 9 by which the upper frame is pivotally attached to the bar 19. For increased rigidity of the frame a flat, U-shaped bar 31 is bolted across between the inner faces of members 24, at a point where it will not interfere with members 25 by which the lower frame is pivotally secured to the bar 19, it being understood that the bar 19 extends outwardly on either side from clamps 20, through the ends of the pivoting members 24 and 25 which are shown in Fig. 8 and Fig. 9. A seed box 93 with mechanism for removing the seed therefrom, of the type commonly operated by a rock shaft, is mounted on a plate 26, visible only in Fig. 1 and Fig. 7, that is bolted to the upper side and middle of cross bars 22, the bolts used for this purpose embracing the front and back sides of bars 22, and passing through flanges on the runner frame 27, thus holding this frame securely to the underside of bars 22. As the mechanism for removing the seed from the box 93 is not a part of this invention no description of it is given. A rock shaft 28 for operating this mechanism is rotatably mounted in suitable bearings 29 that are bolted to the underside of the rear of bars 21. An arm 30 for throwing the bar 28 is clamped to it so as to extend upwardly and at a forward angle thereto. The runner 33 and its supporting frame 27 are similar in construction to those in common use on corn planters, with the exception that the rear of the runner 33 extends backwardly in two parallel parts which slidably embrace the lower part of the boot section 32. This boot or tube down which the seed passes to the furrow is in two sections, the upper one 34 being a part of the runner frame 27, and extending downwardly within the upper part of the lower section 32, the latter being pivoted to it at the sides, as shown in Fig. 2 and Fig. 12. A seed checking valve 35 is of a size to work freely through a slot 36 in the back of the section 32 and between the side walls thereof, so that when in a normal position, as indicated by the dotted lines in Fig. 11, it will, in conjunction with a similar but stationary element 37, close the bottom of the section 32. Element 37 is held in place by a bolt 38 passing through a flange 39, the upper end of said element and the arm 40. When drilling seed this part 37 can be removed through a slot in the front of the boot in which it normally rests. The outer end of valve 35 is pivoted on a right angle arm of rod 41 that extends upwardly through two bearings or guides 42 and 43 secured to the side of the boot section 32, to directly opposite the point where the lower section is pivoted to the upper one, as shown in Fig. 12. At this point a left hand arm of rod 41 passes at right angles through the forked end of a lever 44 that is pivoted to the side of the runner frame 27 (Figure 11). On the front end of lever 44 a post 46 is pivotally mounted so as to be capable of pivotal movement in a rearward direction only. A compression spring 47, mounted between the upper end of this post and a flange 48 on the upper side of lever 44, holds the post in an erect position under the end of an arm 45 that is fixed to the rock shaft 28. As the throw bar is rotated the arm 45 thrusts downward on 46, thus actuating the lever 44 to lift the rod 41 and the valve 35 to the position shown in Fig. 11. A slight further movement downward of the arm 45 releases 46 and permits the spring 49 to push rod 41 downward, thus closing the valve and returning lever 44 to normal position as indicated by dotted lines. In the return movement of arm 45 it pushes the upper end of post 46 rearwardly and rides into position above it. It will be seen that as the normal or inoperative point of contact between the upper end of rod 41 and the fork of lever 44 is directly in line with the point on which the lower boot section 32 pivots to the upper section 34, the valve 35 will not be moved by the relative pivotal action of the sections. An arm 40 which is fixed to the lower section 32 has its front end pivoted to a controlling device that will be described later.

The lower frame 50 consists of a piece of flat bar which is bent so that the rear half of the frame will be rectangular in shape, as shown in Fig. 7. About midway of the frame, from front to back, the side bars are spaced by a plate 51 riveted to them, and from this point forward they diverge to points 52 whence they extend forwardly, parallel to one another, then upwardly within channels in the pivotal members 25 to which they are bolted. A U-shaped bar 53 fits between the pivotal members 25 and is bolted to them. The rear of frame 50 is supported on two ground wheels 54, mounted on axles 55 that are secured to the side bars of frame 50 by clamps 56. To prevent twisting of the frame 50 and to space the rear of the planting units and to guide their pivotal movement in planes perpendicular to the main frame, plates 57 are riveted to the sides of the rear of the frame so as to have slidable contact within angle iron guides 58 that are clamped to the main frame axle 9 and spaced top and bottom, by bars 59 (Figures 1, 7 and 15). A lever 60 is pivotally mounted between vertical plates 61 and 62 that are bolted, through right angle extensions, to plate 51, from which they extend upwardly through a slot in plate 26 (Figure 7), their bases being spread and plate 51 notched (Figure 17) to permit the lifting of the runner frame 27 as shown in Fig. 2. Plate 62 extends upward beyond the pivotal point to form a toothed segment to engage the lever dog. A round bar 63 is clamped across the top of bars 21 so as to work in a longitudinal slot C in a lower arm of the lever 60, thus by the raising or lowering of the lever the upper frame is raised or lowered, and the position of the runner is regulated to secure the desired depth of planting.

To provide for simultaneous operation of the planting mechanism of the units in whatever position their pivotal movement over the undulations of the ground may place them at the time of checking, a main rock shaft 64 is hung in suitable bearings 65 that are bolted to the underside of bars 2. The outer ends of this bar extend through and are rotatably held in check head frames 66, the usual forks 67, adapted to be actuated by a knotted wire, being secured to the outer ends of the bar 64. On the same side of each unit as the arm 30, a U-shaped element 68 is clamped to the draw bar 1 by clamps 69. There is a longitudinal slot in both of the parallel sides of element 68, which extends backwardly at right angles from draw bar 1. A rod 70 pivotally connected to the arm 30, extends forward to between the sides of element 68, where its forked end is slidably and pivotally mounted by a pin 71 that passes through the forked end, to which it is fixed, and the slots on either side. To the rock shaft 64 is bolted an arm 72 that inclines forward at the same angle as the arm 30, and its upper end, slotted from the top down, extends up through the element 68 and between the sides of the forked end of rod 70, where it straddles the pin 71, as shown in Fig. 17. As the fork 67 is actuated by the wire and the throw bar 64 is turned thereby, the arms 72 will operate to thrust the rods 70 backwardly, the front ends of these rods being held to horizontal movement by the pins 71 sliding in the guiding slots of the element 68. Thus the same length of thrust will be simultaneously delivered to all the arms 30, for equal movement of the individual rock shaft in the units. Springs 94 (shown only in Fig. 1) are rigged between the draw bar 1 and arms 95 on the rock shaft 64 for returning the operating elements just described to normal position. And as the pins 71 are normally positioned on a line with the axes of the bars 19, the arms 30 are not affected by the pivotal movement of the units, the upper ends of these arms being always the same distance from the pivotal point.

Each check head is in two sections. The front section 66 being substantially the front half of a common check head secured to the draw bar 1 and rearwardly from it by a clamp that is part of the check head frame, the upright rollers being mounted on the clamp and the horizontal rollers on a pivoted arm, as shown in Fig. 2 and Fig. 3. The rear section 73 or wire guide consists of a Y-shaped support vertically mounted on the axle 9 by a clamp that is part of the support. The upright rollers are mounted on an arm projecting at right angles from the support, and the horizontal rollers are mounted on a pivoted arm as shown in Fig. 3, a lever being pivoted to the rear arm of the Y having its upper end connected by a rod 74 to a similar lever on the frame 66, so that a backward pull on the rod 74 will lift the horizontal rollers and release the wire, as shown in Fig. 3. Wire guides 73 are essential features of this type of planter as they permit the check heads proper to be set in close to the outside planting units, thus reducing the width of the machine and allowing the wire to be brought back at a sharp angle behind the planter, so that the planting may be started at a proper distance from the end of the field.

There are two identical controlling devices, each to hold the lower part of boot sections 32 in two units from forward or backward movement. Each has two guide members 75 (Figure 12) held parallel to one another by spools 76, as shown in Fig. 12, and riveted to angle bars 77 that are secured by U-bolts to the main frame bar 2. Braces 78 (Figure 1) are bolted to the front angle bar and to a plate 79, which is bolted to the bar 2, and braces 80 extend from this plate to the front guide member (Figure 2). Between the angle bars 77 the upper ends of square sleeves 81 are pivoted at 82. Each of these sleeves 81 slidably receives a rod 83, the outer end of which terminates in a fork that is pivoted by a cotter pin 96 to the end of a round plug 84 that is rotatably held in a round collar forming the front end of arm 40. Between the ends of the spools 76 and the guides 75 are shims which may be removed as the parts wear, for adjusting the guides 75 relative to the sleeves 81. It will be seen that as a unit pivots downward (see dotted lines in Figure 15) the lower part of the tube 32 will be held from forward movement by the above described parts, and the rear of the runner will slip forward on the tube. The effect of the control members to hold the bottom of the boot from backward movement is shown in Figure 2.

Two covering wheels 85 to press dirt over the planted seed, are arranged behind each unit, being mounted on slanting axles bolted to the underside of a plate 86, that is attached by two flat bars 87 to axle 9, around which they are bent and loosely bolted for pivotal movement. A weight for giving the proper pressure to the wheels 85 may be carried on and secured to plate 86. When the planter is to be backed, the wheels 85 may be raised to the position shown in Fig. 2 and held there by a latch 88 that is pivoted to a bar 89, so as to drop in front of the upper one of bars 59.

When this planter is to be moved along highways or through narrow gates, the right and left hand units may be removed by loosening clamps 90, 91, and 92 that hold the outer sections of the rock shaft 1, the throw bar 64 and the axle 9, respectively, to the main sections of these parts, and these units may then be entrained behind the rest of the machine in any suitable manner.

From the foregoing description taken in connection with the accompanying drawings the advantages of construction and the method of operation of the improved planter will be readily apparent to those skilled in the art to which this invention appertains, and while I have shown and described in detail this embodiment of my invention, nevertheless it will be understood the mechanism disclosed is capable of considerable variation in its mechanical details without departing from the spirit of the invention or sacrificing any of its material advantages.

What I claim is:—

1. In a planter, a main frame; bars offset from and fixed to said frame with their axes in line; seeding units pivoted on the offset bars; seed checking valves in the units; actuating elements on the main frame to operate said valves; connections between the actuating elements and the valves; parts of said connections having operable contact with the actuating elements in line with the axis of the offset bars; said contact permitting pivotal action of the parts about this axis, so that the pivotal action of the units will not tend to operate the valves.

2. In a planter, a main frame; seeding units pivotally connected with said frame for free independent movement up and down; seed checking valves movably positioned in the units; and control members mounted on the main frame and connected with the valves to hold them, in the pivoting of the units, from forward or backkward movement relative to the main frame.

3. In a planter, in combination, a main frame; bars offset from and fixed to said frame with their axes in line; seeding units pivoted on the offset bars; seed checking valves movably positioned in the units; actuating elements on the main frame to operate the valves; connections between the valves and the actuating elements; parts of said connections having operable contact with the actuating elements in line with the axis of the offset bars, said contact permitting pivotal action of the parts about this axis; and control members on the main frame and connected with the valves to hold them from forward or backward movement relative to the main frame.

4. In a planter, in combination, a main frame; seeding units pivotally connected with said frame for independent movement; furrow opening runners with extending sides in the units; seed tubes pivotally suspended in the units, and having their lower ends slidably embraced by the sides of the runners; seed checking valves in the tubes; control members mounted on the main frame and connected with the tubes to hold the valves from forward or backward movement relative to the main frame.

5. In a planter, in combination, a main frame; seeding units pivotally connected with the main frame; seed tubes pivotally suspended in the units; seed checking valves in the tubes; actuating elements on the main frame to operate the valves; connections between the actuating elements and the valves; said connections having parts in operable contact with the actuating elements in line with the axis on which the units pivot, said contact permitting swinging movement of the parts up and down relative to the actuating elements; said connections including in each unit a mechanism having a joint at a point opposite on a transverse line to the pivotal point of the tube, so that the pivoting of the units and of the tubes relative to the units will not open the valves; and control members on the main frame and connected to the tubes to hold the valves therein from forward or backward movement relative to the main frame.

6. In a planter, in combination, a main frame; bars offset from and fixed in line to said frame; seeding units pivoted on the offset bars for independent movement; seed tubes pivotally suspended in the units; seed checking valves in the tubes; control members mounted on the main frame and connected to the tubes to prevent forward or backward movement of the valves relative to the main frame; a main rock shaft on the main frame; said shaft being adapted to be actuated by a knotted wire; arms on the main rock shaft; auxiliary rock shafts in the units; rods between the main rock shaft arms and the auxiliary rock shafts; said rods having operable contact with the main rock shaft arms at points normally in line with the axis of the offset bars, so that the pivoting of the units will not tend to operate the auxiliary shafts; and mechanisms between the auxiliary shafts and the valves, each of said mechanisms having a joint normally opposite, on a transverse line, to the pivotal point of the tube, so that the pivoting of the tube will not open the valve.

7. In a planter, in combination, a main frame; seeding units connected to said frame for independent pivotal movement; pivotally suspended seed tubes in the units; seed checking valves in the tubes; control members mounted on the main frame and connected to the tubes to prevent forward or backward movement of the valves relative to the main frame, said members including vertical guides, extensible shafts pivotally connected with the main frame for swinging movement in the guides, and connecting elements between the extensible shafts and the tubes.

8. In a planter, in combination, a main frame; bars offset from and fixed in line to said frame; seeding units pivoted on the offset bars; seed checking valves in the units; a rock shaft on the main frame, said shaft being adapted to be actuated by a knotted wire; arms on the rock shaft; horizontal guides on the main frame; rods in the units, each having one end operably connected with a valve and the other end having a slot and pin connection with a horizontal guide and a lost motion connection with a rock shaft arm at a point normally in line with the axis of the offset bars, for simultaneous and uniform operation of the valves in the actuation of the rock shaft.

9. In a planter, in combination, a main frame; bars offset from and fixed to said frame with their axes in line; seeding units pivoted on the offset bars; seed tubes pivotally hung in the units; seed checking valves in the tubes; control members on the main frame and connected to the tubes to hold the valves from forward or backward movement relative to the main frame; a rock shaft on the main frame, said shaft being adapted to be actuated by a knotted wire; arms on the rock shaft; horizontal guides on the main frame; connections between the rock shaft arms and the valves; said connections including in each unit a rod, a slot and pin connection between one end of the rod and one of the horizontal guides and a lost motion connection between said end of the rod and one of the rock shaft arms at a point normally in line with the axis of the offset bars, and including at the other end of the rod joined elements having a joint at a point normally opposite, on a transverse line, to the pivotal point of the tube for simultaneous and uniform operation of the valves in the actuation of the rock shaft.

In testimony whereof I affix my signature.

LESTER M. THOMPSON.